United States Patent
Kruer et al.

[15] 3,660,747
[45] May 2, 1972

[54] STEP MOTOR AND CONTROL CIRCUIT THEREFOR

[72] Inventors: Clifford W. Kruer; John R. Frazier, both of Dayton, Ohio

[73] Assignee: The National Cash Register Company, Dayton, Ohio

[22] Filed: Aug. 27, 1970

[21] Appl. No.: 67,403

[52] U.S. Cl. ........................................................318/696
[51] Int. Cl. ...............................................H02k 37/00
[58] Field of Search ....................310/49; 318/138, 685, 696

[56] References Cited

UNITED STATES PATENTS

| | | | |
|---|---|---|---|
| 3,385,984 | 5/1968 | O'Regan | 318/696 |
| 3,444,447 | 5/1969 | Newell | 318/696 |
| 3,345,547 | 10/1967 | Dunne | 318/696 |
| 3,466,520 | 9/1969 | Aylikci et al. | 318/696 |

Primary Examiner—Gene Z. Rubinson
Attorney—Louis A. Kline and Albert L. Sessler, Jr.

[57] ABSTRACT

A step motor has three phase windings and is operated with one phase winding continuously energized and the other phase windings alternately energized, each to select one of two possible step positions. The three phase windings separately develop flux between pole portions of the stator and a rotor responsive to the magnetic flux in the stator pole portions moves between two positions of least reluctance as the second and third windings are alternately energized. By means of associated control circuits, each of the second and third windings, when de-energized, is permitted to dissipate its back e.m.f. through the first winding to momentarily increase the magnetic flux developed with said first winding. Accurate step positioning without overshoot and without detent means is achieved by a timed interruption in the energization of whichever of the second and third windings is initiating a shift in the rotor position, the arrangement of stator windings being such that upon re-energization of the step initiating phase the flux developed by the step initiating phase will operate to arrest rotor movement.

4 Claims, 6 Drawing Figures

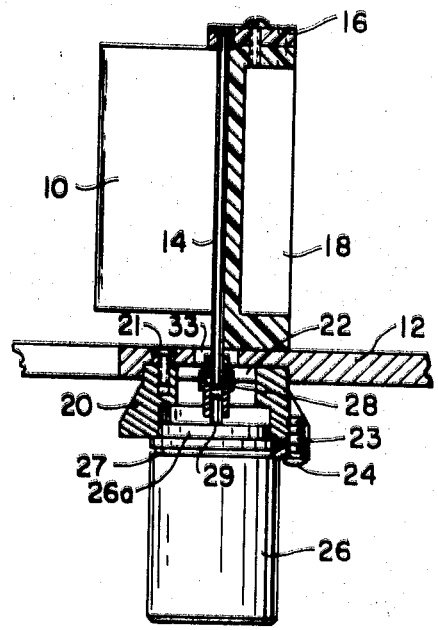
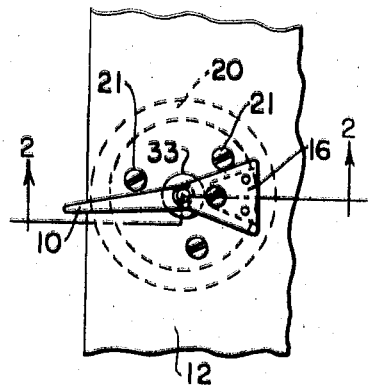
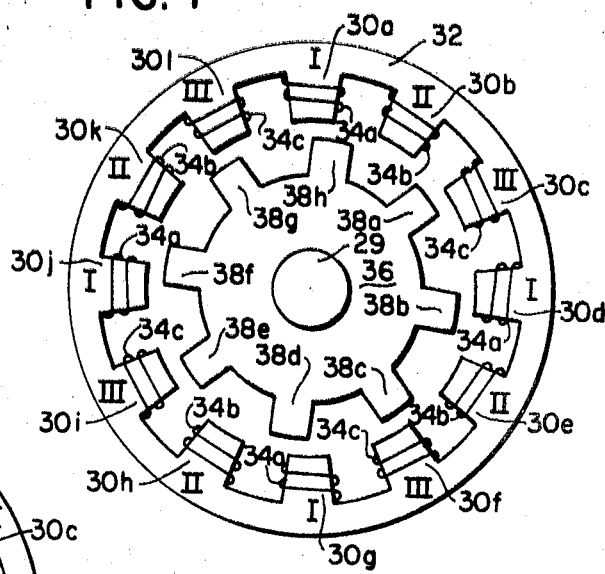
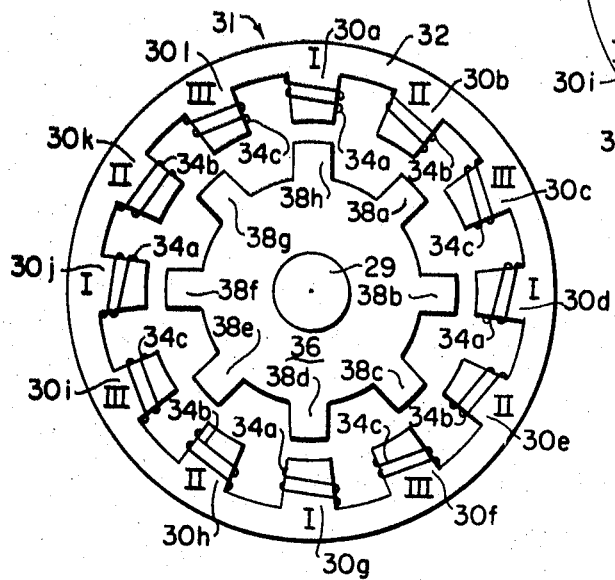

INVENTORS
CLIFFORD W. KRUER &
JOHN R. FRAZIER,

THEIR ATTORNEYS

INVENTORS
CLIFFORD W. KRUER &
JOHN R. FRAZIER

THEIR ATTORNEYS

STEP MOTOR AND CONTROL CIRCUIT THEREFOR

BACKGROUND OF THE INVENTION

1. Field of the Invention

This invention relates to electromagnetic step motors and to control circuitry for operating the same. More particularly, the invention relates to a new and improved mode for operating a step motor which is of a known construction.

2. Description of the Prior Art

A commercially available type of step motor, known as a variable reluctance stepping motor, comprises a stator having twelve circumferentially spaced pole pieces of which four pole pieces spaced at 90° intervals are wound with a first phase winding, another four pole pieces each spaced 30° to one side of the aforementioned pole pieces are wound with a second phase winding, and the remaining four pole pieces each disposed 30° to the opposite side of the first mentioned pole pieces are wound with a third phase winding. Disposed within the stator is a rotor having eight teeth which are equally spaced at 45° intervals. With such construction any one of the three phase windings can be energized to cause the rotor to assume a position of least reluctance. In typical operation the rotor is stepped to a new position by de-energizing whatever phase has brought the rotor to its present position an then energizing either one of the other two phases. One of such other phases will cause a 15° clockwise step, and the other phase will cause a 15° counterclockwise step.

This type of variable reluctance stepping motor offers an advantage over competitive types by reason of the fact that the rotor can be moved in 15° increments in any direction without the need of a mechanical detent to position the motor at the end of each step. A mechanical detent is not needed because whatever phase has been energized to cause a step creates a magnetic field in the nature of a potential well which resists movement of the rotor out of the new position to which it steps.

This potential well can be likened to two hillsides opposite a common valley. A ball rolling from a given elevation down the first hillside rolls through the valley and then up the second hillside to an elevation at which its kinetic energy is zero. Then the ball returns downwardly on the second hillside through the valley and up the first hillside, thus rolling back and forth through the valley until all of the kinetic energy generated by the initial roll down the first hillside is dissipated through heat losses. Then the ball comes to rest in the valley.

The detent action in the described variable reluctance stepping motor is analogous to the stopping of a ball in such a gravitational well but, of course, is concerned with a magnetic potential well. In the variable reluctance motor above described, the detent action is positive in the sense that the rotor upon reaching its new position will not leave the magnetic potential well associated with this new position. On the other hand, the rotor will oscillate at its new position in the same manner that a ball rolling between two hillsides will oscillate.

SUMMARY OF THE INVENTION

In accordance with the present invention, the tendency of the rotor to oscillate at its new position is eliminated for all practical purposes by a novel mode of operation of the step motor described above. In this new mode of operation the rotor steps between opposite sides of a magnetic potential well and is "caught" by a properly timed magnetic field at a point where its kinetic energy has diminished to zero while "rising" one side of the potential well. The magnetic potential well is established by continuously energizing a first of the three phase windings. If a second of the phase windings is also energized, the rotor will shift 7½° in response to the presence of the field from this second phase. In practical effect, the second phase winding has lifted the rotor partway out of the potential well established by the continuously energized first phase. This establishes one of two available index positions in accordance with the present invention.

The other index position is reached, in principle, by de-energizing the second phase and energizing the third phase. This will cause the rotor to move back through the potential well to a position 7½° to the other side of the potential well, thus creating a 15° rotor movement. The available step positions are thus 7½° to one side of a potential well maintained by a continuously energized phase and 7½° to the other side of the same potential well.

To avoid oscillation of the rotor after moving from one index position to another, the phase which will establish the new position is first briefly energized to accelerate the rotor through the potential well. This is like giving a push to a ball rolling down one hill to assure that the ball will roll upwardly at least as high onto an adjacent hill.

After the phase which will establish the new rotor position has given a momentary acceleration to the rotor as described, the phase is de-energized thus permitting the rotor to coast freely through the potential well established by the continuously energized phase. Due to the momentary input of energy from the phase that will establish the new rotor position, the rotor moves at least 7½° to the opposite side of the potential well and, by means of circuit timing devices, the phase which will establish the new rotor position is re-energized at the proper time to "catch" the rotor when its kinetic energy has been dissipated in attempting to leave the potential well. This is like catching a ball which has been pushed down one hill at exactly the time the ball loses its kinetic energy upon moving up an adjacent hill. Here however the rotor is being caught between two competing magnetic fields at a time when the rotor is without kinetic energy and therefore at a time when the rotor will come to rest without oscillation.

As previously stated, the step motor construction is a well known prior art construction. The present invention thus resides in the new mode of operation as above described and in the circuitry for accomplishing this new mode of operation.

BRIEF DESCRIPTION OF THE DRAWINGS

In the drawings,

FIG. 1 is a fragmentary plan view of a gate device embodying the present invention.

FIG. 2 is a fragmentary section view taken along the line 2—2 of FIG. 1.

FIG. 3 is a schematic plan view illustrating the interior construction of a variable reluctance stepping motor suitable for use in the present invention but operated as in the prior art.

FIG. 4 is a schematic plan view illustrating the same motor as in FIG. 3 but operated in accordance with the present invention.

DESCRIPTION OF THE PREFERRED EMBODIMENT

Figure 5:
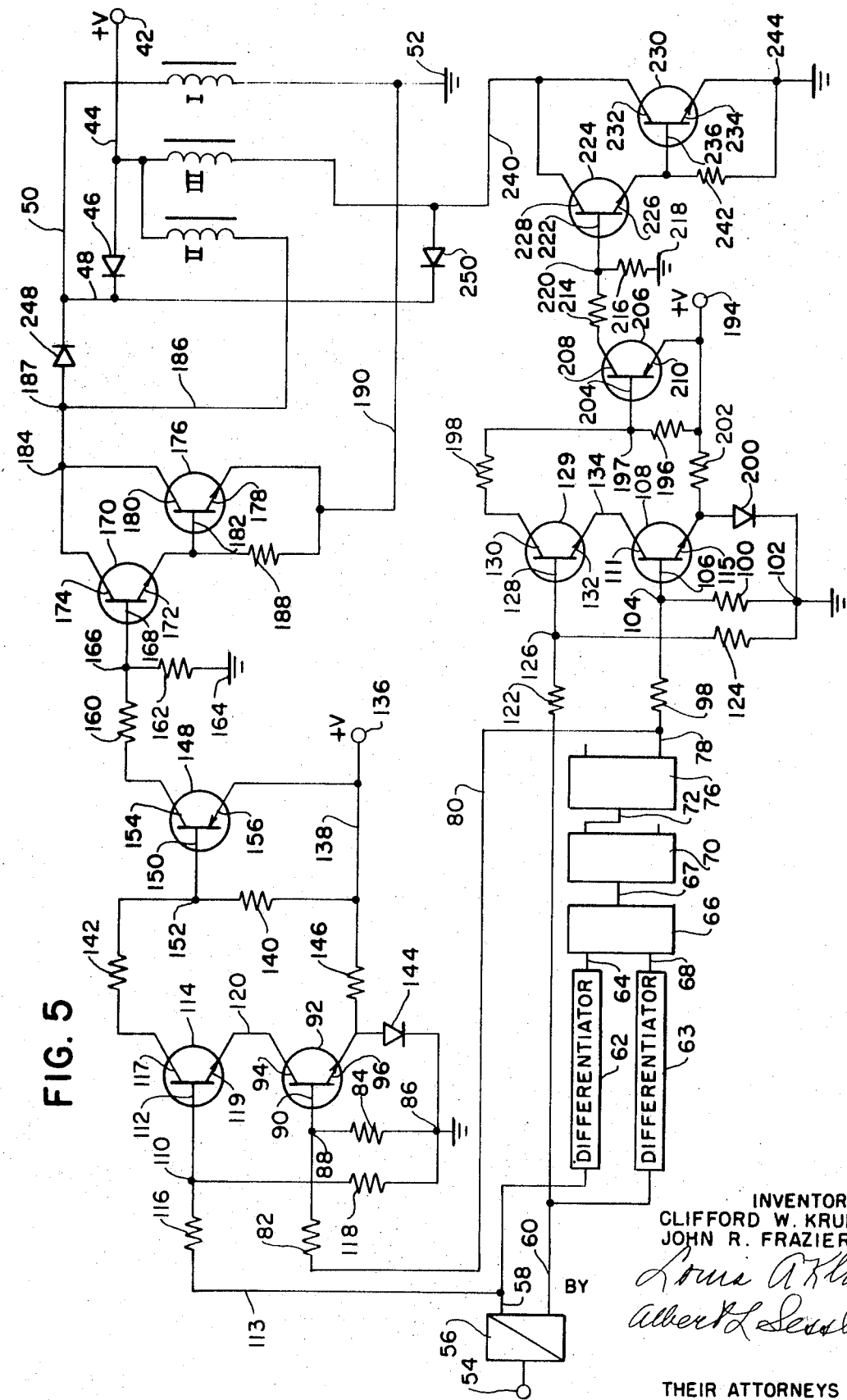
FIG. 5 is a schematic illustration of an electrical circuit suitable for operating the stepping motor in accordance with the present invention.

As an aid to a full understanding, the invention is described in reference to a practical application in the form of a diverter gate. Diverter gates are required in various types of automated equipment used for high speed sorting of computer cards, mailing pieces and the like.

With reference to FIGS. 1 and 2 of the drawings, the reference number 12 identifies a table or platform over which items such as postal envelopes, not shown, may be advanced on edge by a suitable conveyor mechanism, not shown. The reference character 10 identifies a vane or gate which can be positioned to divert envelopes advanced from left to right, as appears in FIG. 1, either to the upper or the lower side of the table 12 as it appears in FIG. 1.

To allow this function, the gate 10 is pivotally supported by a vertically disposed shaft 14 to which the vane 10 is fixedly attached. The upper end of the shaft 14 receives bearing support in a suitable aperture disposed in a plate 16 fixedly mounted to an upstanding support member 18 fixedly mounted to the table 12.

Fixedly mounted under the table 12 is an annular ring 20 which enters a circular recess 22 formed in the underside of the table 12 and which by interfitting this recess aligns itself concentric to the shaft 14. The ring 20 is fixedly mounted by means of screws 21 passed through the table 12.

The ring 20 serves as a mount for a variable reluctance stepping motor 26. To allow such mounting the motor housing includes a cylindrical boss 26a which is slidably received by the interior wall of the ring 20. The motor housing is also equipped with an annular groove 27 adapted to be entered by clamps 23 secured to the ring 20 by screws 24. Such mounting, known as a servo mounting, securely positions the motor 26 in concentric alignment to the shaft 14.

The stepping motor 26 has an output shaft 29 coupled to the shaft 14 by means of a conventional jaw type coupling 28. The table 12 is equipped with an aperture 33 suitably large to pass the upper portion of the jaw coupling 28 and thus allow quick disassembly of the coupling should removal of the vane 10 be desired.

FIG. 3 is a schematic illustration of the internal construction of the variable reluctance step motor 26. The motor comprises a stator 31 within which rotates a rotor 36 affixed to the shaft 29. The stator 31 is preferably of laminated construction and is shaped so as to have twelve circumferentially disposed pole pieces or elements labeled 30a through 30l supported in a circular array by a cylindrical wall 32. Each of the 12 pole pieces is encircled by a coil and the 12 coils are connected in groups of four to provide a three phase winding structure.

In FIG. 3 the phases are identified by the Roman numerals I and II and III applied to the pole pieces 30a through 30l. Thus, the pole pieces 30a, 30d, 30g and 30j are surrounded by coils 34a which are electrically interconnected to form Phase I. The pole pieces 30b, 30e, 30h and 30k are surrounded by electrically connected coils 34b which form Phase II of the winding structure. Likewise, the pole pieces 30c, 30f, 30i and 30l are surrounded by coils 34c which form Phase III of the winding structure.

In terms of their functional utilization, the coils which encircle the pole pieces of the stator may be regarded as sources of electromagnetic flux. Likewise, the pole pieces which are surrounded by the coils may be regarded as flux carriers.

The rotor 36 is a laminated structure shaped to have a circumferential array of eight equally spaced pole parts or elements designated 38a through 38h. Suitable bearings, not shown, journal the shaft 29 within the stator 31 and thus support the rotor 36 for rotation within the stator.

It will be noted that the mounting of the rotor within the stator is such as to allow an annular clearance gap between the pole parts of the rotor and the pole pieces 30a through 30l on the stator. This allows the rotor to have free rotation within the stator. During such rotation the rotor parts change relative position with respect to the stator pole pieces but the clearance gap remains substantially constant.

The prior art mode for operating a stepping motor designed as described in reference to FIG. 3 proceeds as follows. It can be assumed that Phase I is energized thus accounting for the position of the rotor illustrated in FIG. 3. To achieve a 15° clockwise step of the rotor, Phase I is de-energized and Phase III energized. This will cause the rotor pole parts 38a, 38c, 38e and 38g to align themselves respectively with the stator pole pieces 30c, 30f, 30i and 30l. To achieve instead a 15° counter-clockwise step Phase I would be de-energized and Phase II energized. This, then, would cause the rotor pole parts 38a, 38c, 38e and 38g to align themselves with the stator pole pieces 30b, 30e, 30h and 30k.

In this prior art mode of operation, the action is one of removing the potential well that has established the motor's present position and creating a new potential well to define a new position to which the rotor steps. The stepping action is somewhat of a snap action in the sense that the rotor moves abruptly to its new position, but when the rotor has reached its new position it will oscillate or hunt at its new position until, as previously explained, its kinetic energy has been dissipated. Obviously if this mode of operation were applied to the vane construction illustrated in FIGS. 1 and 2, this oscillation or hunting of the rotor would be transmitted to the vane 10 and the oscillation of the vane at its new position would be manifested by an irregularity in the direction and angle to which envelopes passing the vane are diverted.

FIG. 4 illustrates the same motor as appears in FIG. but illustrates the motor at one of the two index positions achieved in accordance with the present invention. Specifically FIG. 4 illustrates the motor at a stable position when both of Phases I and III are energized. Phase I is a continuously energized phase which provides a potential well attracting the rotor parts 38b, 38d, 38f and 38h to radial alignment with the stator pole pieces 30d, 30g, 30j and 30a. By reason of the fact that Phase III is also energized, the rotor parts 38a, 38c, 38e and 38g are also being strongly attracted to the pole pieces 30c, 30f, 30i and 30l. This attraction by the Phase III pole pieces has drawn the rotor 36 7½° in the clockwise direction thus producing the position illustrated in FIG. 4. It can be noted in FIG. 4 that Phases I and III have pulled the rotor parts to symmetric positions with respect to the pole pieces wound with these phases. Thus, the rotor parts 38g and 38h are symmetrically disposed about the energized stator pole pieces 30l and 30a and a like symmetry can be found for all other rotor parts.

In order to achieve a 15° step from the position illustrated in FIG. 4, the basic operating concept of this invention is to de-energize Phase III whereupon the rotor will rotate toward a position where its pole parts 38h, 38b, 38d and 38f will become aligned with the Phase I pole pieces. In making this movement the rotor 36 will acquire a kinetic energy which will carry the rotor almost 7½° beyond the Phase I pole pieces. The object is to then "catch" the rotor by a timed energization of Phase II, thus "catching" the rotor by means of a new field configuration developed with aid of the Phase II pole pieces at precisely the point where the rotor has overshot the Phase I pole pieces by 7½°.

As a practical matter however the rotor cannot be expected to overshoot the Phase I pole pieces by as much as 7½° because there will be friction losses attending the rotor movement. In order to be assured that the rotor will acquire enough kinetic energy to complete its 15° stroke upon de-energization of Phase III, the present invention utilizes a brief energization of Phase II at the same time Phase III is de-energized so as to give the rotor a slight push into the potential well created by Phase I. The objective here is to give the rotor just sufficient acceleration to overcome the deceleration that will occur due to friction in the rotor bearings and thus assure that the rotor will move through a fifteen degree stroke within the potential well provided by Phase I. As the rotor completes its 15° stroke, Phase II is again energized so that when the rotor has expended its kinetic energy in moving against the field produced by Phase I. for all other rotor parts.

In order to achieve a 15° step from the position illustrated in FIG. 4, the basic operating concept of this invention is to de-energize Phase III whereupon the rotor and its load, the vane, will rotate toward a position where its pole parts 38h, 38b, 38d and 38f will become aligned with the Phase I pole pieces. In making this movement the rotor 36 will acquire a kinetic energy which will carry the rotor almost 7½° beyond the Phase I pole pieces. The object is to then "catch" the rotor by a timed energization of Phase II, thus "catching" the rotor by means of a new field configuration developed with aid of the Phase II pole pieces at precisely the point where the rotor has overshot the Phase I pole pieces by 7½°.

As a practical matter however the rotor and its load cannot be expected to overshoot the Phase I pole pieces by as much as seven and one-half degrees because there will be friction losses attending the rotor movement. In order to be assured that the rotor will acquire enough kinetic energy to complete its fifteen degree stroke upon de-energization of Phase III, the present invention utilizes a brief energization of Phase II at the same time Phase III is de-energized so as to give the rotor a slight push into the potential well created by Phase I. The objective here is to give the rotor just sufficient acceleration to overcome the deceleration that will occur due to friction in the rotor bearings and thus assure that the rotor will move through a 15° stroke within the potential well provided by Phase I. As the rotor completes its 15° stroke, Phase II is again energized so that when the rotor has expended its kinetic energy in moving against the field produced by Phase I, the rotor will find itself in a condition of zero kinetic energy and exactly equal and opposing magnetic fields. The rotor will therefore come to a complete stop.

The 15° step taken by the rotor upon de-energization of the Phase III can thus be subdivided into three basic force conditions. The first is a free movement through the potential well provided by Phase I. The second is a small push provided by the step initiating phase to overcome friction losses attending this "free" movement; and the third is a re-energization of the step initiating phase at the proper time to neutralize or offset the magnetic field of Phase I when the rotor is completing its step and reaching a condition of zero kinetic energy.

It will be noted that the two operating positions reached by the rotor in accordance with the operating mode of the present invention require, as a minimum, three stator pole pieces and three rotor pole parts. It will also be noted that the three stator pole pieces subtend an angle of approximately 60° extending in the direction of movement for the rotor pole parts, and the three pole parts for the rotor subtend an angle of approximately 90° along the same direction.

Those skilled in the art will recognize that phase windings such as in Phase II and Phase III are not instantaneously turned off or turned on. Thus, when a given phase is switched off, the field associated with that phase must be given time to collapse. The time required for collapse depends upon the means available for dissipating the energy associated with the collapsing field. In the present invention this means is uniquely supplied by causing whichever field is being collapsed, i.e., the Phase II or Phase III field, to discharge its energy into the Phase I winding. Since this discharge occurs immediately after a step motion is initiated, the effect of this discharge is to momentarily strengthen the field associated with the Phase I winding and give a further, albeit small, push tending to overcome friction losses. This push is additive to the momentary push being created by an energization of the step initiating phase.

The circuitry by which the foregoing operation can be accomplished is illustrated in FIG. 5. Schematically depicted in the upper right of FIG. 5 are the three phase windings of the step motor illustrated in FIG. 4. These windings have been designated by the Roman numerals I, II and III. A voltage for energizing these phase windings is applied to terminal 42. This voltage is continuously applied through the conductor 44, the diode 46 and a conductor 50 to Phase I which is grounded at 52. Phases II and III are alternatively energized by circuitry subject to control of a flip-flop 56.

The circuit contemplates a source of position change signals which will be applied to the trigger terminal 54 of the conventional flip-flop 56. As an example, the position change signals may be derived from a reader device which will read address codes on envelopes; decide whether the vane 10 should be shifted from its present position, and, if a shift is required, deliver a pulse to the terminal 54 to trigger the flip-flop 56, thus to change the state of the flip-flop.

For convenience the states of the flip-flop 56 may be described as a "true" state and a "false" state. Further, the true state may be described as a state in which the voltage at the output conductor 58 is at a logic level of "one" and the output conductor 60 is at a logic level of "zero." Likewise, the false state can be considered a state in which the voltage of the output conductor 58 is at a logic level of "zero" and the voltage of the output conductor 60 is at a logic level of "one."

Changes in the voltages at the output conductors 58 and 60 are sensed by the differentiators 62 and 63. Whatever the change one of the differentiators will output a true signal to fire a Schmitt trigger 66. For this purpose the differentiators have output conductors 64 and 68 to the Schmitt trigger. The Schmitt trigger 66, which normally applies no voltage to its output conductor 67, outputs a brief pulse at the logic level "one" each time the flip-flop 56 changes state. This brief pulse triggers a one-shot 70.

As well understood by those skilled in the art, the one-shot 70 includes an RC timing circuit and will apply a voltage at the logic level of "one" to its output conductor 72 for a period of time determined by its RC timing circuit. For reasons which will be more fully described in a later part of this specification, the one-shot 70 is designed to sustain a logic level of "one" on its output conductor 72 for a period of 6 milliseconds.

At the end of 6 milliseconds the logic level on the output of the one-shot 70 drops to "zero" and this drop fires a second one-shot 76 also timed to change state at the end of 6 milliseconds. The output conductor 78 of the one-shot 76 is normally at a logic level of "one" and switches to a logic level of "zero" only during the 6 millisecond time interval controlled by the RC timing circuit of the one-shot 76.

The output conductor 78 is connected to ground at 86 through a conductor 80 and resistors 82 and 84. Resistors 82 and 84 divide the voltage to a level at 88 which is applied to the base 90 of a transistor 92. Transistor 92 includes a collector 94 and an emitter 96.

The output conductor 78 is also connected to a ground at 102 through resistors 98 and 100. The resistors 98 and 100 divide the voltage on the output conductor 78 to provide a voltage at junction 104 which is applied to the base 106 of a transistor 108. The transistor 108 has a collector 111 and an emitter 115.

Whatever logic level appears on the conductor 58 from the flip-flop 56 is dropped through conductor 113, resistor 116 and resistor 118 to ground at junction 86. Resistors 116 and 118 divide the voltage to provide a voltage at junction 110 which is applied to the base 112 of a transistor 114. Transistor 114 has a collector 117 and an emitter 119. The emitter 119 of transistor 114 is connected to the collector 94 of transistor 92 by a conductor 120.

Whatever logic level appears at conductor 60 of the flip-flop 56 is dropped through resistors 122 and 124 to ground at 102. The resistors 122 and 124 divide the voltage at junction 126 for application to the base 128 of a transistor 129 having a collector 130 and an emitter 132. The emitter 132 of transistor 129 is connected to the collector 111 of transistor 108 through conductor 134.

A collector voltage for the transistor 114 is applied to a terminal 136 and passed through conductor 138 and resistors 140 and 142 to the collector 117. The voltage at terminal 136 is also dropped to ground through a bias resistor 146 and a diode 144.

At such times as both the transistors 92 and 114 are conductive, the voltage applied to terminal 136 will be divided between the resistors 140 and 142 to establish a voltage at the junction 152 which is applied to the base 150 of a transistor 148. The transistor 148 has a collector 154 and an emitter 156. When an appropriate voltage appears at the junction 152, the transistor 148 will become conductive, whereupon the voltage at the terminal 136 will be dropped to ground at 164 through the resistors 160 and 162. This will provide a bias voltage at junction 166 which is applied to the base 168 of a transistor 170. Transistor 170 also has a collector 174 and an emitter 172.

Connected to form a power Darlington with the transistor 170 is a transistor 176 having an emitter 178, a collector 180 and a base 182. The collector 180 is connected to the collector 174 at junction 184. Junction 184 is also exposed to the voltage applied at terminal 42 through the Phase II winding and conductor 186 to junction 187. At such time as transistor 170 becomes conductive, the voltage drop to ground across the resistor 188 will initiate conductivity in the transistor 176.

At such time as transistor 176 becomes conductive, the Phase II winding will have a direct connection to ground through conductor 186, transistor 176 and conductor 190. The full voltage available at terminal 42 will therefore be applied to the Phase II winding. It will be noted that this voltage application occurred without interruption of the continuous application of voltage through the diode 46 and conductor 50 to the Phase I winding.

Those skilled in the art will recognize that the transistors 92 and 114 are connected for operation as an AND gate. When both the bases 90 and 112 receive a positive voltage, the transistor 148 is rendered conductive to initiate a circuit function in which Phase II becomes energized. When either of the bases 90 and 112 lacks the necessary positive voltage, the transistors 92 and 114 fail to establish a conductive path such as to initiate conductivity in the transistor 148 and accordingly Phase II is not energized. The consequence is that Phase II can be energized only when both of the transistors 92 and 114 receive a sufficient positive voltage at their respective bases.

The transistors 108 and 129 provide a similar AND gate controlling the operation of the Phase III winding. An operating voltage for this AND gate is applied to the terminal 194 and tied to ground at terminal 102 through a bias resistor 202 and a diode 200.

The voltage at terminal 194 is applied to the collector 130 through resistors 196 and 198. At such time as both of the bases 106 and 128 receive an adequate positive voltage, the transistors 108 and 129 become conductive providing a ground path for the voltage at terminal 194 through the resistors 196 and 198 and the diode 200. The resistors 196 and 198 divide the voltage at junction 197 for application to the base 204 of a transistor 206. Transistor 206 has a collector 208 and an emitter 210.

When a sufficient positive voltage appears at junction 197, transistor 206 becomes conductive whereupon the voltage at terminal 194 is dropped to ground at 218 through resistors 214 and 216. Resistors 214 and 216 form a voltage divider which develops a voltage at junction 220 for application to the base 222 of transistor 224. Transistor 224 has a collector 228 and an emitter 226. The application of a positive voltage at junction 220 in response to conductivity in transistor 206 renders transistor 224 conductive. Coupled to the transistor 224 as a power Darlington is the transistor 230 which has a collector 232, emitter 234 and base 236. The collector 228 of transistor 224 receives positive voltage from the terminal 42 through the winding for Phase III and the conductor 240. At such time as the transistor 224 is rendered conductive, this voltage is dropped to ground through the resistor 242 creating a positive bias for the base 236 of transistor 230. This renders the transistor 230 conductive, providing a direct path to ground at junction 244 for the Phase III winding.

Accordingly, when the AND gate comprising the transistors 108 and 129 becomes conductive, Phase III is energized. It is to be noted that the base of the transistor 129 and the base of the transistor 114 are always receiving opposite polarities from the output conductors 58 and 60 of the flip-flop 56. It is therefore never possible for the AND gate governing Phase II and the AND gate governing Phase III to simultaneously implement energization of Phases II and III. Thus, while Phase I remains continuously energized, Phases II and III are always alternately energized.

Of course, when either of Phases II and III is energized due to a change of state in the flip-flop 56, the energization proceeds for only a six millisecond period controlled by the one-shot 70, whereupon the phase being energized is de-energized for a period of 6 milliseconds controlled by the one-shot 76, then re-energized.

When either of Phase II or Phase III is de-energized, an e.m.f. will be developed as the magnetic field associated with the de-energized phase collapses. In the present invention, the collapse of the magnetic field associated with either of Phases II and III is conveniently facilitated by permitting the collapsing phase to discharge its e.m.f. to Phase I. Thus, Phase II has a discharge path through conductor 186, diode 248 and conductor 50 to the Phase I winding. Similarly, the Phase III winding has a discharge path through conductor 240, diode 250, conductor 48 and conductor 50 to the Phase I winding. This circuit construction allows each of Phases II and III, at the time of any de-energization thereof, to momentarily boost the magnetic field being continuously created by Phase I.

Figure 6:
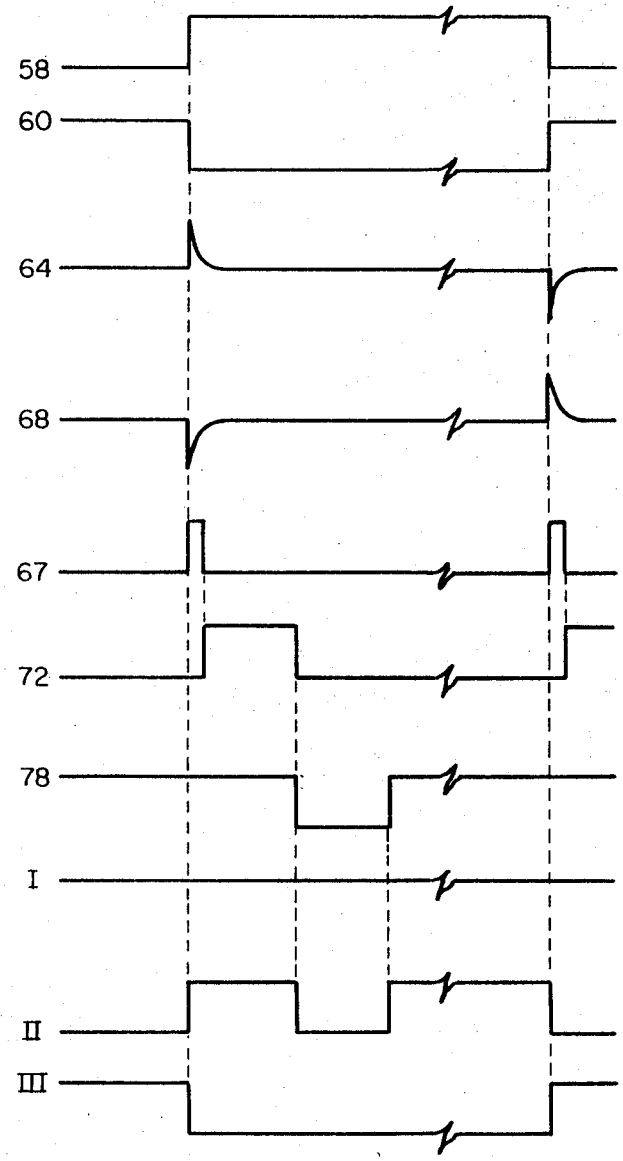
FIG. 6 is a chart illustrating the voltage appearing at various portions of the circuit of FIG. 4 during an operating cycle of that circuit.

FIG. 6 is a voltage chart which has been prepared to assist in correlating the operation of the circuit of FIG. 5 with the operation of the step motor shown in FIG. 4. FIG. 6 depicts the voltages of the conductors 58, 60, 64, 68, 67, 72 and 78 during a representative operating cycle for the circuit of FIG. 5. FIG. 6 also correlates the voltage drops across the Phase I, II and III windings to the operating cycle being illustrated. It can thus be noted in FIG. 6 that Phase I, being continuously energized, is illustrated as having a continuous voltage drop. No attempt has been made to illustrate the relatively modest enhancement of the voltage drop across the Phase I winding that will occur when either of Phases II and III collapses.

In the upper left hand corner, FIG. 6 illustrates the occurrence of a shift in the state of the flip-flop 56. This shift is manifested by appearance of a true signal at the conductor 58 and a false signal at the conductor 60. As soon as a true signal appears on the output conductor 58, the AND gate comprising the transistors 92 and 114 is enabled, thus firing Phase II of the motor windings and accordingly a voltage difference appears across the Phase II winding.

Whenever the conductors 58 and 60 change their voltage states, the differentiators 62 and 63 react to the change. In this case, the differentiator 62 pulses a true signal to its output conductor 64 and this true signal triggers the Schmitt trigger 66. Triggering of the Schmitt trigger results in a short duration pulse on its output conductor 67. On the fall of this pulse, the one-shot 70 is fired creating a 6 millisecond true signal on its conductor 72. On the fall of this true signal from the one-shot 70, the one-shot 76 fires to produce a 6 millisecond false signal at its output conductor 78.

The false signal appearing at the output conductor 78 disables the AND gate comprising the transistors 92 and 114 with the result that Phase II is de-energized for an approximate 6 millisecond time interval.

The behavior of the rotor 36 of the stepping motor is best considered in reference to the voltage line for the Phase II winding as it appears in FIG. 6. The Phase II winding can only be energized contemporaneously with a de-energization of Phase III. Thus, upon any energization of the Phase II winding initiated by a change of state of the flip-flop 56, the rotor must necessarily be in a position controlled by the simultaneous energization of Phases I and III, i.e., the position illustrated in FIG. 4. When, upon a change of state of the flip-flop 56, Phase III is de-energized and Phase II energized, the rotor will commence a 15° stroke in the counterclockwise direction as illustrated in FIG. 4. In essence, the rotor is rotating into the potential well maintained by the Phase I winding and the energization of the Phase II winding is being used to push the rotor into the potential well with a sufficient force that the rotor can complete its 15° stroke. After a 6-millisecond pulse to Phase II, Phase II is de-energized so as to merely permit the rotor to swing through the potential well afforded by the Phase I winding. At the time the Phase II winding is again energized (6 milliseconds later), the rotor has swung through the potential well to a position where it is substantially without kinetic energy. Thus, when Phase II is re-energized, Phase II cooperates with Phase I to "catch" the rotor in a new potential well formed by the joint action of Phases I and II and at a time when the rotor is without kinetic energy. The rotor is thus stopped in a new position after a 15° step without any appreciable oscillation.

Continued energization of Phases I and II will hold the rotor in its new position and this holding action will last for an indefinite period until an appropriate signal has changed the state of the flip-flop 56. At such time as the state of the flip-flop 56 is changed, the circuit of FIG. 5 will assume the voltage conditions illustrated to the right hand side of FIG. 6 and a return step of the rotor to the position illustrated in FIG. 4 will be initiated.

It is to be noted that the circuit of FIG. 5 achieves two positions of the rotor 36. The circuit of FIG. 5, operating in conjunction with the motor illustrated in FIGS. 2 and 4, is thus capable of two vane positions, one to deflect envelopes upwardly as appears in FIG. 1, and the other to deflect envelopes downwardly as appears in FIG. 1.

Having thus described our invention, we claim:

1. An apparatus to position a movable magnetic member to first and second positions in response to first and second signals, respectively, comprising:

first, second, and third flux-producing means;

said first flux-producing means biasing said magnetic member to an intermediate position between said first and second positions; and control means, in response to said first signal, deenergizing the third flux-producing means and simultaneously energizing the second flux-producing means sufficiently long to enable said member to move past said intermediate position and to arrive at said first position with substantially no kinetic energy, and thereafter energizing said second flux-producing means, enabling said first and second flux-producing means to hold said member at said first position;

said control means, in response to said second signal, deenergizing said second flux-producing means and simultaneously energizing the third flux-producing means sufficiently long to enable said member to move past said intermediate position and to arrive at said second position with substantially no kinetic energy, and thereafter, energizing said third flux-producing means, enabling said first and third flux-producing means to hold said member at said second position.

2. The apparatus as claimed in claim 1 in which said control means further include circuit means for transferring to said first flux-producing means the e.m.f. which is produced each time said second and third flux-producing means are deenergized, thereby increasing the strength of said first flux-producing means.

3. A two-position stepping motor comprising: a rotor of magnetically permeable material having a plurality of radially extending poles distributed around the axis thereof;

a stator of magnetically permeable material surrounding said rotor and having a plurality of poles extending radially toward the axis of said rotor and distributed about the axis of said rotor;

first, second, and third winding circuits on said stator; and control means comprising:

means to continuously energize said first winding circuit to radially align one of the rotor poles with one of the stator poles to provide a magnetic potential well; and a control circuit to step said rotor to first and second positions on opposite sides of said well;

said control circuit, in response to a first signal, deenergizing said third winding circuit and simultaneously energizing said second winding circuit for a short duration, and thereafter reenergizing said second winding circuit at a time when the rotor has substantially zero kinetic energy at said first position;

said control circuit, in response to a second signal, deenergizing said second winding circuit and simultaneously energizing said third winding circuit for a short duration, and thereafter reenergizing said third winding circuit at a time when the rotor has substantially zero kinetic energy at said second position.

4. A two-position stepping motor comprising:

a rotor of magnetically permeable material having a plurality of radially extending poles distributed around the axis thereof;

a stator of magnetically permeable material surrounding said rotor and having a plurality of poles extending radially toward the axis of said rotor and distributed about the axis of said rotor;

first, second, and third winding circuits on said stator; and control means for controlling the rotation of the rotor to first and second positions;

said control means including:

means to continuously energize said first winding circuit;

a control circuit responsive to first and second position change signals for controlling the energization of said second and third winding circuits to rotate said rotor to said first and second positions in response to a first change signal;

said control circuit, in response to said first change signal, deenergizing said third winding circuit and simultaneously momentarily energizing said second winding circuit to enable it to assist said first winding circuit in moving said rotor to said first position, where said rotor has substantially zero kinetic energy; and thereafter reenergizing said second winding circuit, enabling said first and second winding circuits to catch and hold said rotor in said first position at a time when said rotor is without kinetic energy;

said control circuit, in response to said second change signal, deenergizing said second winding circuit and simultaneously momentarily energizing said third winding circuit to enable it to assist said first winding circuit in moving said rotor to said second position, where said rotor has substantially zero kinetic energy; and thereafter reenergizing said third winding circuit, enabling said first and third winding circuits to catch and hold said rotor in said second position at a time when said rotor is without kinetic energy.

* * * * *